(12) United States Patent
Goldberg et al.

(10) Patent No.: US 6,726,092 B2
(45) Date of Patent: Apr. 27, 2004

(54) PORTABLE DEVICE SERVICE PAYMENTS BY MULTIPLE MEANS

(75) Inventors: Steven Jeffrey Goldberg, King of Prussia, PA (US); Alain Charles Louis Briancon, Poolesville, MD (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/040,999

(22) Filed: Dec. 28, 2001

(65) Prior Publication Data
US 2003/0121967 A1 Jul. 3, 2003

(51) Int. Cl.[7] .............................................. G06F 17/00
(52) U.S. Cl. ........................................ 235/375; 235/380
(58) Field of Search ........................................ 235/375

(56) References Cited

U.S. PATENT DOCUMENTS

| | | | | | |
|---|---|---|---|---|---|
| 6,154,532 A | * | 11/2000 | Lockhart et al. | ............ | 379/143 |
| 6,188,756 B1 | * | 2/2001 | Mashinsky | .................. | 379/207 |
| 6,438,355 B1 | * | 8/2002 | Syed et al. | ................. | 379/354 |

* cited by examiner

*Primary Examiner*—Harold I. Pitts
(74) *Attorney, Agent, or Firm*—Volpe and Koenig (57) ABSTRACT

Method and apparatus for use in a variety of communications systems providing one or more payment alternatives for communication services and automatically selecting of a group of alternative payment techniques while significantly reducing the amount of interactive activity required from the user. Upon entry of a request to establish communications between calling and called electronic devices, the system initially looks towards a primary service provider. Absent acceptance of the request for service by the primary service provider, for whatever reason, the system automatically reverts to an alternative service provider and/or payment provider by searching data provided by the user and coupled to the electronic device for which a communication link is requested, eliminating the need for any further input by the user in the form of redialing the call, providing data through insertion of a debit or credit card, for example, identifying the alternative payment provider. The data identifying alternative service/payment providers may be contained in a card or chip removably insertable into the electronic device or in a storage device incorporated therein. Capability may be provided for choosing the most economic service/payment provider to be selected for honoring the request for service.

42 Claims, 5 Drawing Sheets

PORTABLE DEVICE SERVICE PAYMENTS BY MULTIPLE MEANS

BACKGROUND

The present invention relates to method and apparatus for arranging payment for communication services. More particularly, the present invention relates to method and apparatus for automatically selecting a payment source from a plurality of alternative sources while significantly reducing and/or eliminating further input from the user in the performance of the selection operation.

The present invention, although extremely useful in communications systems comprised of cellular telephones, may also be used with a variety of diverse electronic devices such as portable computers, portable data assistants (PDAs), internet appliances and, in general, any electronic device for which a communications link must be established with another device or service through a link not normally utilized and/or requiring payment for use thereof.

Although one of the principal applications employs radio frequency (RF) links between the device requesting service and another device for service, it should be noted, as will be described hereinbelow in further detail, that the communications link requiring payment need not necessarily be the link from the device to some access point.

The area of application of the present invention resides in the handling of payment for communication services on-line and automatically and in real time.

One typical communications link is that in which cellular phone subscribers employ a link operated by a particular provider for establishing communications between a calling user and a called user. A variety of different techniques may be employed for paying the service provider for the communications link.

For example: The user of the cellular telephone (or other device) may have a service contract with the service provider. The cost of the link established at the calling user's request is handled by the service provider providing service to the calling user. The cost for the communications link requested by the user is directly assumed by the service provider based on the terms of the contract. The service provider may be entitled to all of the total cost of the service in the example where the calling subscriber is operating in the home cell where the user is based. Alternatively, the total cost of the communications link may be shared by the home cell as well as a remote cell when the calling subscriber is roaming in a remote cell and the requested communications link requires the services of both the remote cell and the subscribers home cell in order to establish the link. In such case the subscriber's service provider may collect the entire fee from the subscriber and share the cost of the communications link with the remote cell.

The service contract may either take the form of a fixed fee for the given amount of services or wherein a portion of the fee is deducted for each service requested or alternatively the service contract may call for a fee which varies depending upon the total amount of service for a given period, (i.e., monthly) for which services the subscriber is billed on a regular basis.

Payment for the communications link may be handled through an electronic wallet wherein monetary information is maintained within the electronic device, one such device being described in U.S. Pat. No. 5,221,838. Briefly, the electronic wallet contains a memory for storing information related to the subscriber such as account number, PIN number, identity of the service provider (e.g., credit card company, communications services provider, etc.) and information for automatically communicating with the service provider to enable the user to engage in a transaction. The cost of the requested service may either be deducted from the subscriber's debit card or alternatively may be billed against the subscribers credit card. A communications service may be billed to a subscribers charge card or debit card held by the subscriber and offered as a mode of payment for the service by manually inputting the user's account information via keypad or magnetic reader attached the electronic device (i.e., telephone) or provided orally to the financial institution sponsoring the debit or credit card service. In the case of a debit card, the cost of the service is deducted from the present balance. In the case of a credit card, the customer is billed for the cost of the service off-line and subsequent to the service being provided. The sponsor of the debit or credit card is responsible for paying those service providers engaged in providing the communications link, which may be a single service provider in the case where the calling and called parties are both within the same home cell, or to one or more service providers wherein one or both of the calling and called parties are in a roaming mode necessitating the use of a service provider in addition to the subscriber's base cell.

Another payment procedure quite frequently used to establish a communication link between two telephone or cell phone users is to reverse charges, (i.e., the calling party requesting a communications link with a called party and further requesting the service provider to ask the called party to honor the cost for the communications link).

Some service providers, such as telephone companies, may offer a service upon contacting an 800 telephone number exchange whereby the cost for a communications link may be billed to the customer off-line.

In still another service paying technique a user may agree to receive advertisements in exchange for communication services, the cost of the communications link being absorbed by the advertiser(s).

Although it can be seen that a variety of different techniques are available to pay for communication services, a significant drawback of present day techniques resides in the fact that all of the various modes and types of payment exist in isolation and are independent of one another. As an example, assuming that one method or mode of payment is unavailable, for whatever reason, the user requesting the service must actively become engaged in an effort to select an alternative mode of payment. For example, assuming that a subscriber to a cellular telephone network attempts to place a call and the service request is denied for whatever reason, the subscriber attempting to request a communications link must personally initiate and engage in an activity to notify the communications network of the alternative mode of payment.

Figure 1:
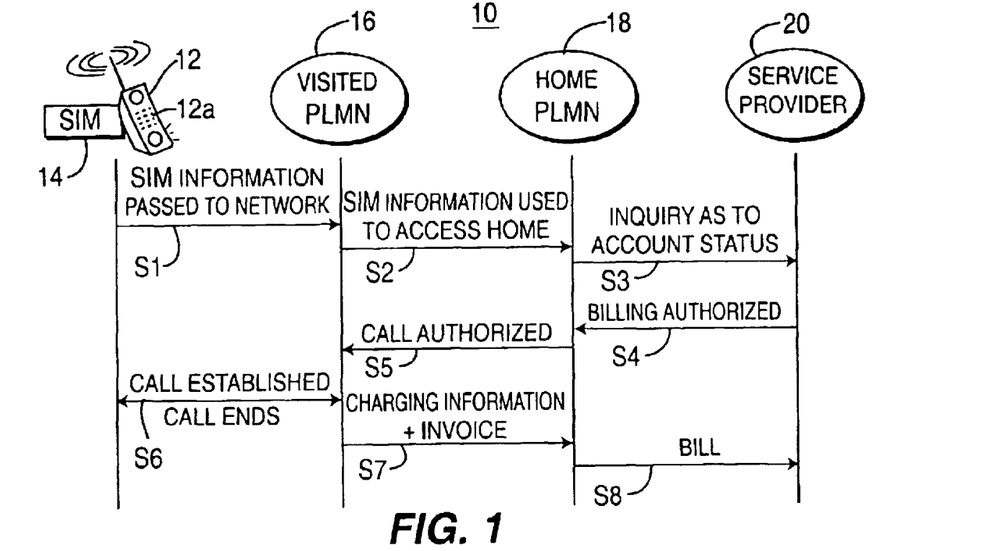
FIG. 1 shows a prior art technique utilized to affect payment to a service provider for a communications link.

A more detailed example of the shortcomings of the prior art can be better understood from a consideration of FIG. 1, which shows a communications network of the global system for mobile communications (GSM) type wherein a subscriber is provided with a cellular telephone 12 capable of receiving a subscriber identity module (SIM) card 14. The subscriber holds a service contract with service provider 20. The subscriber assigned the cellular telephone 12 is roaming in a visited public land mobile network (PLMN) 16 which is remote from the subscribers home PLMN 18. The cost for the call is attended to in accordance with the terms of the service contract whereby the subscriber, in seeking to communicate with a called subscriber (not shown), initiates a call causing the payment provider information on the SIM card 14 to be passed to the visited PLMN 16, as shown by step S1. This SIM information is used to access the home PLMN, at step S2. The home PLMN 18, at step S3, makes an inquiry as to the account status of the service contract for the mobile unit 12.

In the case where that the service provider 20 finds that the billing is authorized, authorization is conveyed through home PLMN 18, at step S4. This is conveyed to the visited PLMN at step S5. The call is established between mobile device 12 and the called party (not shown) which may be another mobile phone assigned to a particular PLMN which is the same as or different from the PLMN of the calling mobile phone or may be a phone in a public switch telephone network (PSTN).

The call is now established as shown by step S6. When the call is completed, the charging information and invoice is forwarded, at step S7, through the home PLMN 18 which electronically transmits a bill, at step S8, to the service provider 20.

The example set forth hereinabove is one in which the activities have been completed in a case where the service provider has authorized the service. However, if the service provider denies billing for the call, for example, in the event that the calling party has exceeded the contract limits or if the service provider can not be reached, regardless of the reason, then the primary and exclusive method of payment has failed. Existing technology has the capability of prompting the calling party to enter a charge card number if the calling party wishes to place the call in spite of the fact that the primary method for payment has failed. This technique imposes a delay in placing the call as well as the need to manually enter alternate payment information. It also unnecessarily ties up the communications link between the calling mobile phone and the contacted members of the communications system.

Although the primary method for payment, in the example given, is by way of a service contract the user of the mobile unit has with the service provider, it should be understood that the primary payment means maybe any one of the other payment techniques set forth here and above. Nevertheless, the user seeking the communications service must rely upon one of the other alternatives if the primary means of payment fails or may not be able to complete the call in the event that the other alternatives are either unavailable or non-existent.

SUMMARY

The present invention solves the problems of the prior art by providing for the automatic selection of one of two or more payment means and/or payment providers which are associated with the user and/or the user device. When a call is made, a primary or preferred payment means is accessed. In the event that they primary means fails, for whatever reason, the technique of the present invention automatically invokes the next available payment alternative. If this technique also fails and there is still another payment alternative, the system of the present invention will proceed to try that alternative as well. The automatic selection of each successive payment alternative eliminates the undue delay imposed by prior art techniques which require a prompt to the user requesting that the user enter additional information, thereby significantly increasing the likelihood of completing a call as compared with present day techniques, as well as reducing the amount of time the calling party is using the communications link before a call is established.

The present invention also permits an operator of a roaming network to strike an arrangement with more than one home network while allowing spontaneous connections with third parties. This technique can be utilized in cases where a customer does not subscriber to any specific service or caller party arrangement.

BRIEF DESCRIPTION OF THE DRAWING(S)

The present invention will be better understood by reference to the detailed description and drawings in which.

DETAILED DESCRIPTION OF THE PREFERRED EMBODIMENT(S)

Figure 2:
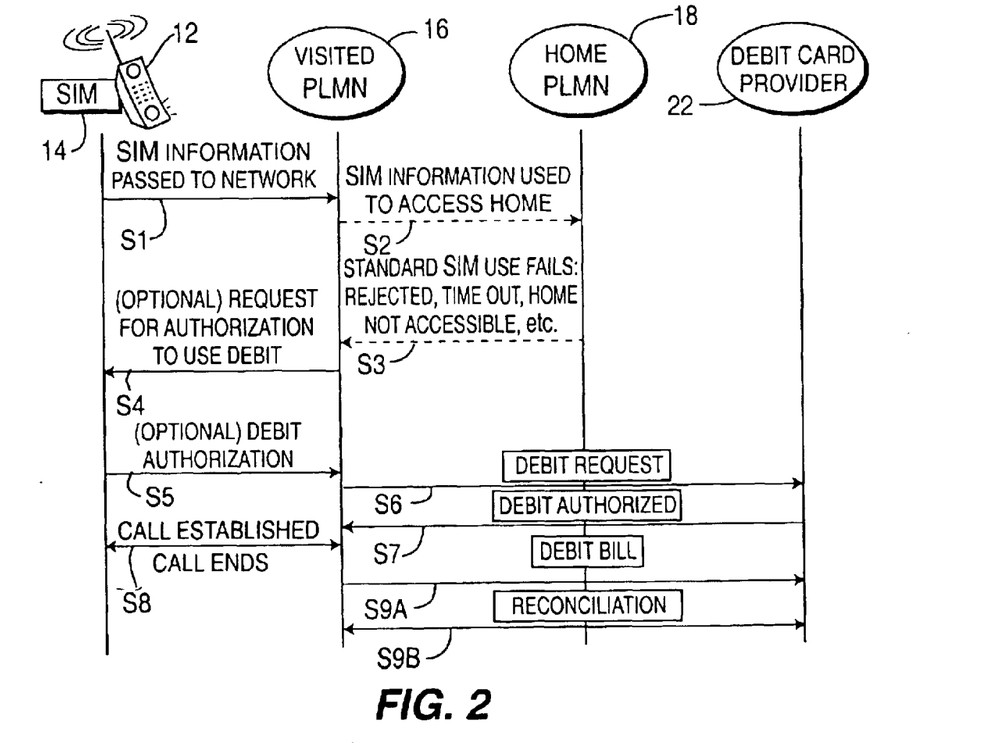
FIG. 2 shown a flow diagram of a communications system employing the technique of the present invention.

FIG. 2 is a flow diagram of one preferred embodiment of the present invention showing a communications system similar to that shown in FIG. 1 wherein like elements are designated by like numerals. In the example shown herein at step S1, mobile unit 12, in attempting to initiate a call, passes information from the SIM card to the network. Since mobile unit 12 is roaming within a visited PLMN 16, the SIM information received by PLMN 16 is employed to access the home PLMN 18. In the example shown, the initial payment means fails, which failure may be due to either being rejected, time out or the home PLMN is not accessible, for example. This failure condition is relayed to the PLMN 16, at step S3.

In the embodiment shown in FIG. 2, as an optional feature, the visited PLMN recognizes that the SIM information includes an alternative payment means but one which the subscriber possessing mobile unit 12 has prearranged that a request for authorization must be given by the subscriber in addition to acceptance by the payment provider. This request for authorization may be a simple "yes" or "no", which response may be entered by pressing the "1" key of a keypad 12a to respond "yes" or pressing the "2" key to enter the response "no". The request is made at step 4 and the mobile unit 12 responds by approving or disapproving of the authorization. The acceptance does not necessitate that the subscriber reinitiate the call.

Assuming that the authorization is given, at step S5, the visited PLMN transmits a debit request to the payment provider, in this case a debit card provider 22, at step S6. The debit card provider, at step S7, transmits authorization for the debit to the visited PLMN 16. The visited PLMN 16, at step S8, establishes the call between the calling mobile unit 12 and the called unit (not shown).

Upon completion of the call, the visited PLMN 16 determines the debit amount and, at step S9A, transmits a debit bill to the debit card provider 22. A reconciliation between the visited PLMN and debit 16 and debit card provider 22 occurs at step(s) S9B.

As an alternative to the described technique, in an example where the contractual arrangement between the debit card provider 22 and the possessor of mobile unit 12 does not require that the calling party provide authorization for use of the caller's debit card, steps S4 and S5 are eliminated, and the visited PLMN 16 directly makes the debit request at step S6, with steps S7 through S9 following in due course and in a manner similar to that described hereinabove.

In the example given in FIG. 2, the provider 22 may alternatively be a credit card provider, the subscriber's internet service provider or electronic wallet, as well as any of the other examples set forth hereinabove.

As a further alternative to the arrangement shown in FIG. 2, the SIM card 14 may have data identifying a preferred payment provider and more then one alternative payment providers. In such case, the automatic technique utilized to select one of the payment means is set forth in the flow diagram shown in FIG. 3.

Figure 3:
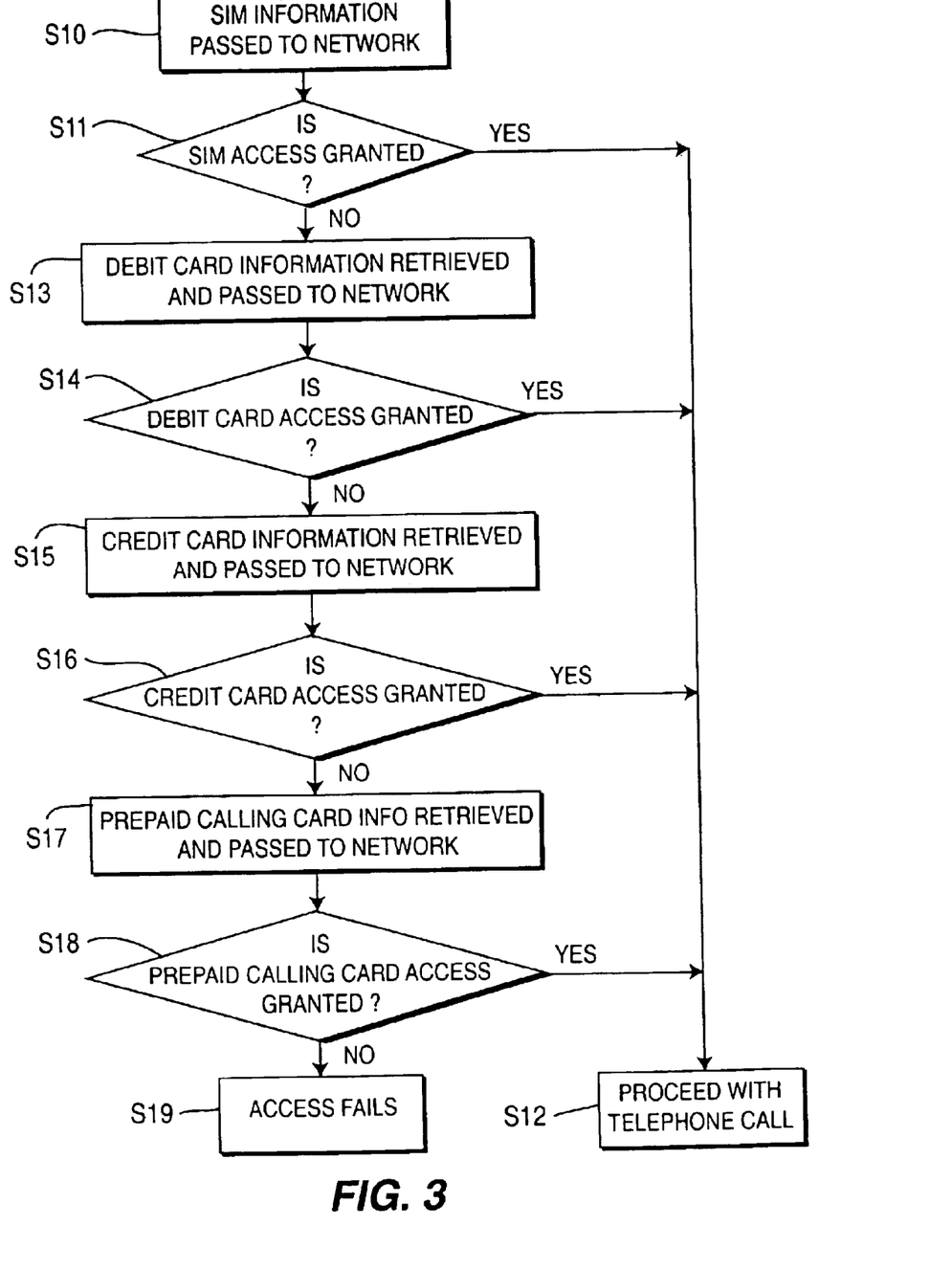
FIG. 3 is a flow diagram showing in greater detail, the matter in which one of the plurality of alternative payment means are accessed.

In order to initiate the performance of the method shown in FIG. 3, a system subscriber initiates a call, for example, whereupon a receiver in the network such as a visited PLMN 16, shown in FIG. 2, receives SIM information passed to PLMN 16 at step S10. The SIM information is examined to determined whether SIM access is granted, at step S11. In the event that SIM access is granted, the program branches to step S12 whereupon the system proceeds with the call, in a manner to be more fully described in detail in connection with FIG. 4.

Assuming that access is not granted, the program branches to step S13, whereupon the data representing the next preferred payment provider is retrieved, at step S13. In the example given, debit card information is retrieved and passed to the network. At step S14 the network determines if the request for debit card authorization is honored. If so, the program branches to step S12. If not, the program branches to step S15, whereupon credit card data stored in the mobile unit 12 is received and is presented to the network. If authorization from the credit card provider is accepted at step S16, the program branches to step S12. In the event that the credit card provider does not accept responsibility for the cost of the communication link, the program branches to step S17 whereupon data representing the next preferred payment provider, in this case a provider of calling cards, is transferred to the network.

The calling card provider is accessed and, if this provider agrees to assume the cost for the communications link, the program branches to step S12. Alternatively, if the cost is not assumed by the calling card provider, the program branches to step S19, advising the subscriber that none of the choices have been accepted and access to the communications link is denied. Alternatively, at that point, the subscriber may be given a final opportunity to manually input information identifying another payment source, such as an alternative credit card.

Although the embodiment shown in FIG. 3 provides for automatically reverting to as many as three alternative provider choices, in the event that the preferred, or first listed provider does not accept responsibility for the payment, a greater or lesser number of alternative payment sources may be utilized without departing from either the scope or spirit of the present invention. In addition, any of the payment providers shown in the example of FIG. 3 may be substituted for other payment providers or added thereto.

Figure 4:
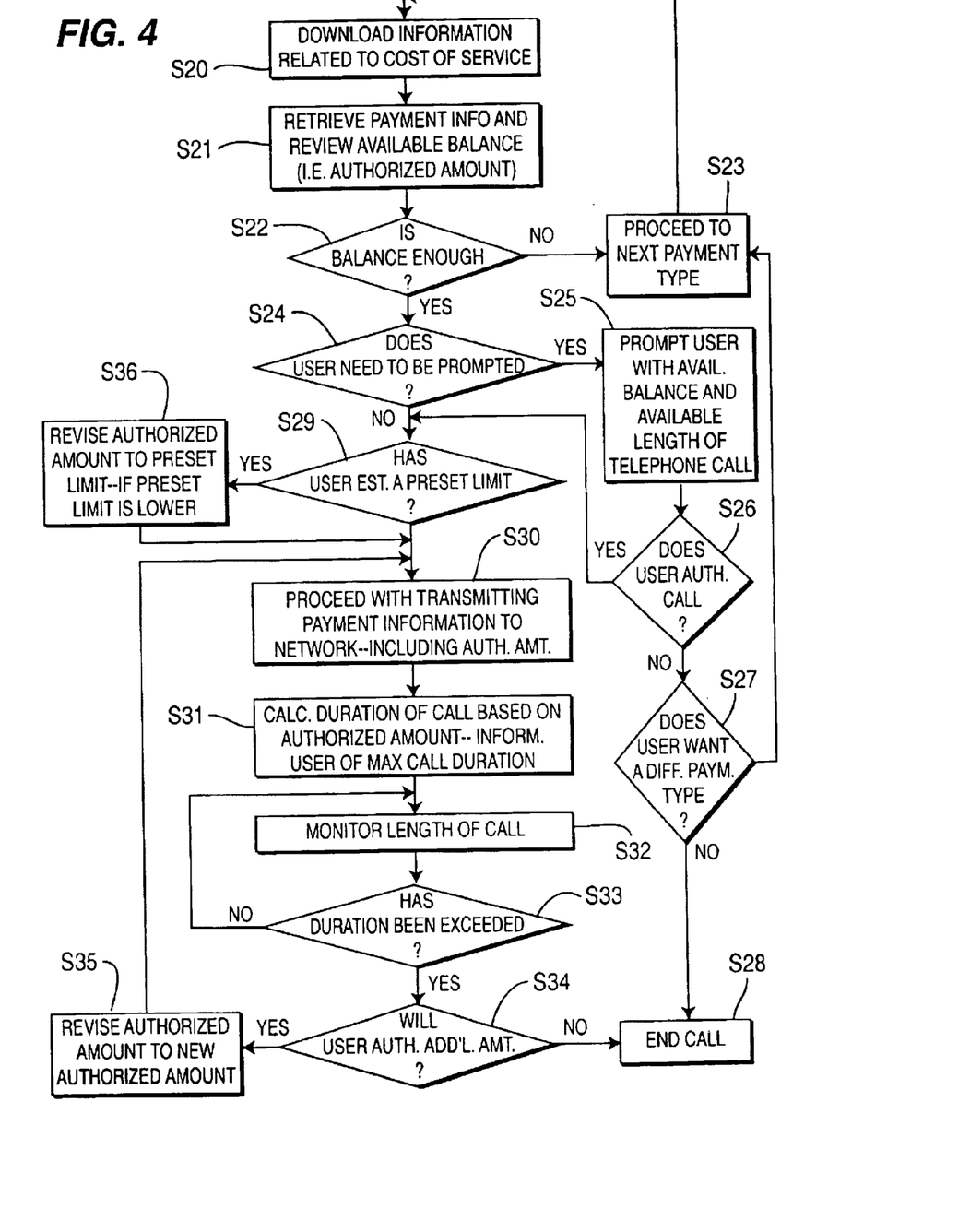
FIG. 4 is a flow diagram showing the manner in which a communication (i.e., call) is handled by the communications system.

Assuming that at least one of the payment providers shown in FIG. 3 honors the request for payment, when the program branches to step S12, this initiates the call, the detailed program steps of which are shown in FIG. 4 where, initially at step S20, information related to the cost of service is downloaded. This information may be limited to a single PLMN or more than one PLMN in the event that the calling party is in a roaming mode. At step S21, payment information is retrieved and the available balance is reviewed. For example, in the event that the provider provides a pre-paid calling card or otherwise has placed a given limit on an individual call (or other type of connection), this information is retrieved and, at step S22, this balance is compared against the cost of service determined at step S20 to determine if the balance is sufficient. If the balance is insufficient, the program branches to step S23 where the program then jumps to the next payment type which, in one example, can be a branch back to the next preferred payment provider such as a branch back to step S13 of FIG. 3.

Assuming that the balance is sufficient, the program branches to step S24 to determine if a prompt to the calling party is required. This is similar to step S4 shown in FIG. 2 whereupon the program shown in FIG. 4 branches to step S25 to prompt the user with the available balance and the available length of call permitted based on that balance. Assuming that a prompt is necessary, at step S24, and that the prompt of step S25 has been provided to the calling party, the caller's response is examined at step S26. Assuming the caller does not authorize payment by the selected payment provider, the program branches to step S27 to determine if the user wants to authorize a different payment provider. This can be responded to by a simple "yes" or "no" by pressing the appropriate key on the keypad 12a, set forth here and above in describing the embodiment of FIG. 2.

If the calling party does wish to request that another payment provider be contacted to honor the call, the program branches back to step S23 which initiates the program steps in the manner described here and above. Assuming that the user does not wish to request another payment provider to honor the payment request for the communications link, the program branches to step S28 causing the calling effort to be ended.

Returning to step S24, if the calling party does not need to be prompted, the program branches to step S29 wherein the network determines if the calling party has a pre-set limit for a call. If there is no pre-set limit, the program branches to step S30 whereupon payment information is transmitted to the network from the payment provider, including the authorized amount.

The network, at step S31, calculates the length of a call that will be permitted based on the amount authorized by the payment provider and provides this as a prompt to the calling party. At step S32, the network monitors the call and, if the duration has been reached at step S33, the program branches to step S34 to determine if the user will authorize the additional amount. If the user will not authorize the additional amount, the program branches to step S28 whereupon the call is ended.

In the event that the caller authorizes the additional amount, the program branches to step S35, revising the authorized amount to a new authorized amount and returning to step S30.

In the event that, upon the examination in step S33, the time limit has not been exceeded, the program loops back to step S32 and this loop is repeated until either the call is completed or the time limit is exceeded.

Figure 5:
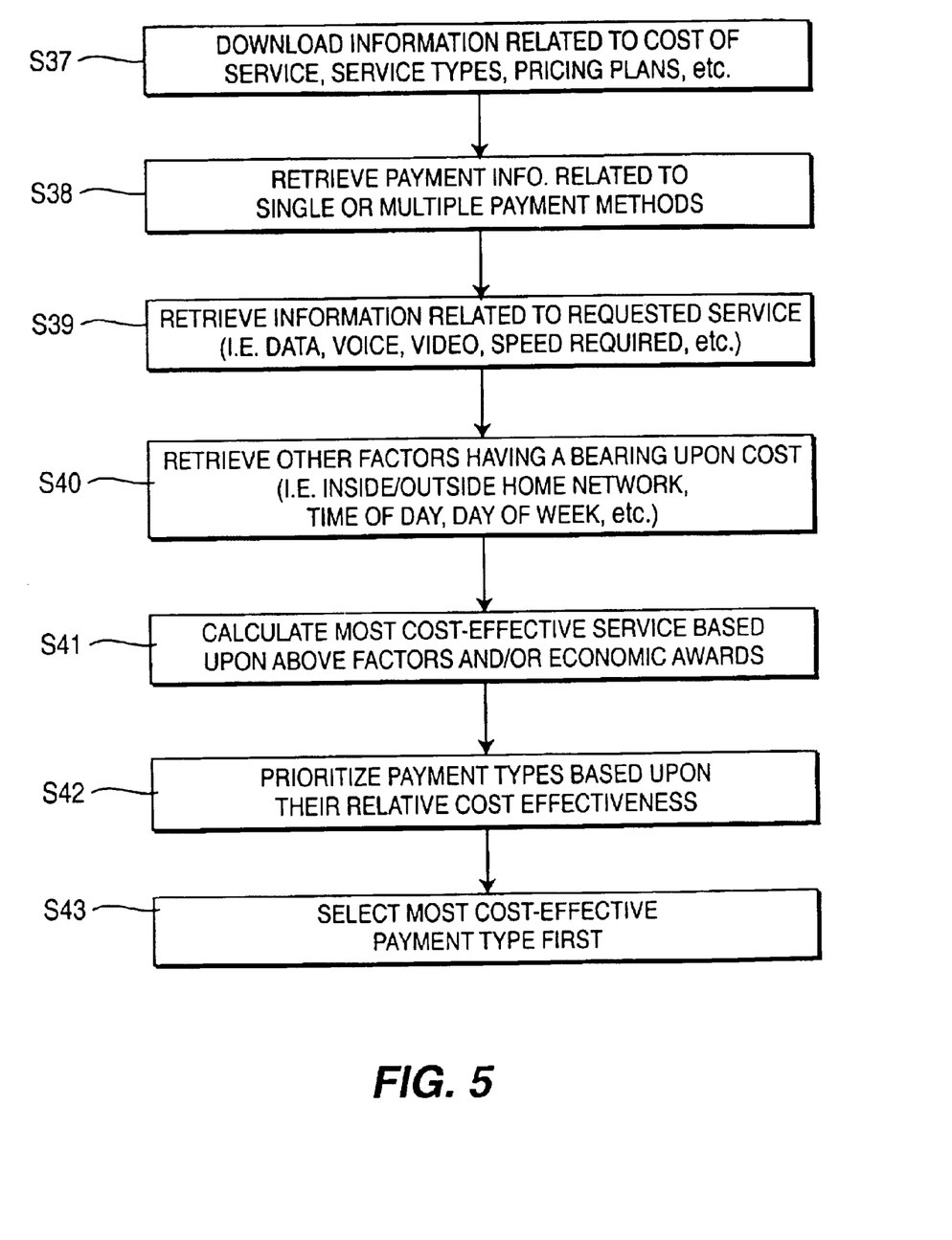
FIG. 5 is a flow diagram showing the manner in which a selection of a payment method is conducted in order to obtain a payment method which is the most economical from the point of view of the subscriber.

The present invention has the further capability of selecting the most cost-efficient payment provider from the group of the preferred provider and alternative providers to assure the subscriber that the network will select that payment provider which will be the least costly to the subscriber (or the most cost efficient). This technique is shown in FIG. 5 wherein the subscriber, upon initiating a call as shown in step S1 of FIG. 2, causes the network, at step S37, to download information relating to the cost of service, such as service types pricing plans, etc. At step S38, payment information related to a single or multiple payment provider is retrieved. This information may be retrieved from a source already known to the subscriber or network. For instance, the subscriber's home database, or the local database of the present network. Alternatively service discovery may be initiated. Two such schemes are SAP (Service Advertising Protocol) and NetBios (Network Basic Input/Output System). The Salutation Consortium (www.salutation.org) is an organization dedicated to providing such services in presently evolving networks. Thereafter information related to the requested service, (such as data, voice video high speed link and/or the data rate required) is retrieved at step S39. At step S40, other factors having a bearing upon cost (such as time of day, day of week, location inside or outside the home network, etc.), are obtained. At step S41, the most cost-effective service is calculated based upon the information retrieved through steps S37 through S40. The expected costs of the different options are obtained through the employment of algorithms such as multiplication of duration/expected duration or data length/expected data length times unit rate; or through look up tables. An alternative approach in place of determining the most cost efficient provider is to determine the payment provider which provides the best economic awards for use of the provider's services. Rewards may be awarding of points, prizes, bonuses, etc., similar to frequent flyer points. The calculations may also take into account both of the providers costs and awards calculations to determine the most cost efficient payment provider. At step S42, the payment providers are prioritized based upon their relative cost efficiency and, at step S43, the most cost efficient payment provider is initially contacted to request the consumption of the subscribers payment cost.

Although the examples discussed hereinabove, describe the communications link as a wireless link, it should be noted that there may be situations where the link requiring payment is not the link from the device to some access point. For example, a link may comprise a land line connection and/or an intermediary RF connection such as for example a satellite. Also, the link may be partially a land line link and partially a wireless link. Nevertheless, the present invention is adaptable to any such communication links. The invention also enables an operator of a roaming network to strike an arrangement with more than one home network while allowing spontaneous connections with third parties. This technique can be utilized in applications where the customer does not subscribe to any specific service or caller party pay arrangement (more information needed here).

In the embodiment of the present invention described hereinabove, the data identifying the alternative payment providers may be stored in the SIM card. It should also be understood that any other type of memory or storage means may be utilized to provide the data such as a universal card, a credit card type card carrying the information on a magnetic strip or a smart card, which devices are removably insertable into the mobile unit to transfer the data to the system or to a suitable storage device (not shown) provided in the mobile unit for subsequent transfer to the system. Alternatively the mobile unit may have a separate memory device containing the data identifying each alternative provider and transferred thereto by any suitable means.

Figure 6:
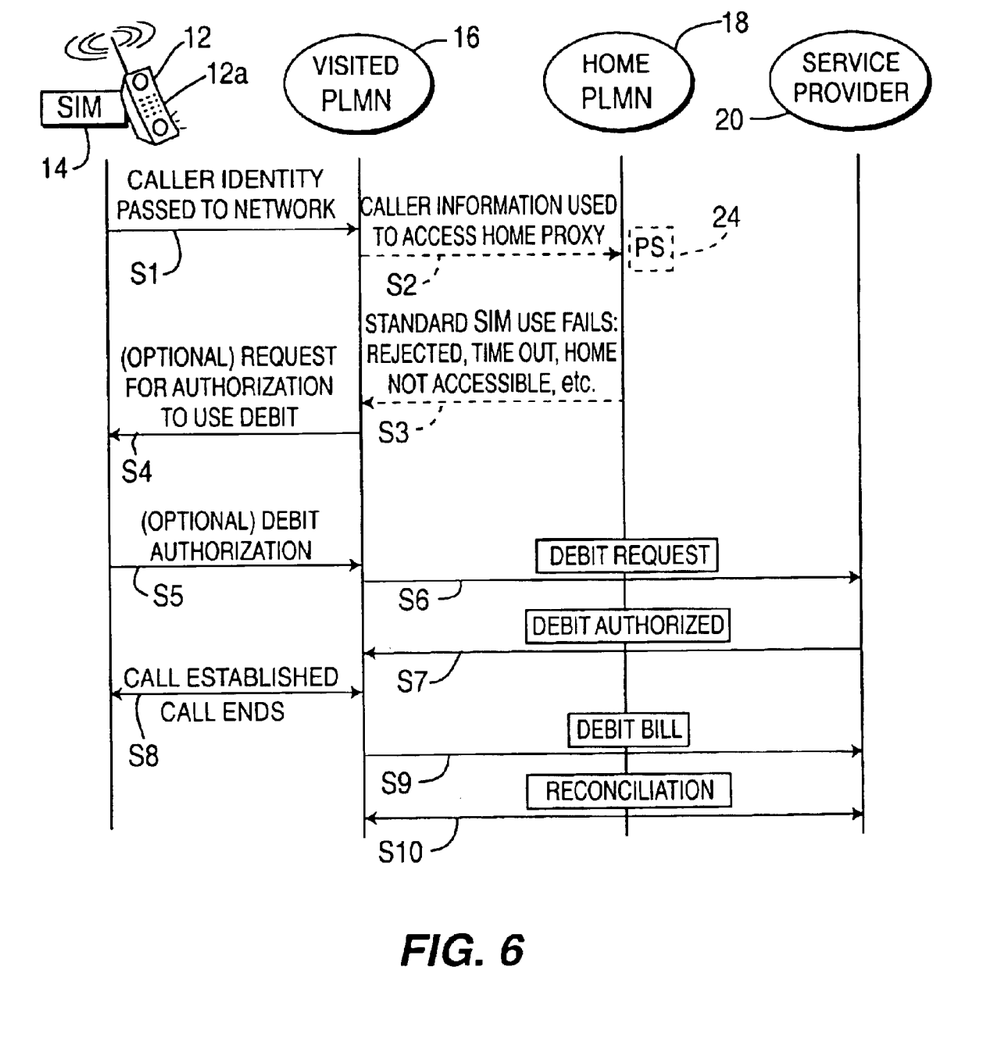
FIG. 6 is a flow diagram showing an embodiment of the present invention in which the subscriber requires the communication system to obtain the authorization of the subscriber payment provider to complete a communications link.

In addition to the above approaches, the data identifying the alternative payment providers may be moved to a device which is not contained within the device that requires the connection, (i.e., that is not contained within the mobile unit 12. As one example, shown in FIG. 6, the information identifying the alternative payment provider may be contained within a proxy in the infrastructure network. The proxy may be part of the home PLMN 18, as shown in FIG. 6 wherein like elements as between FIGS. 2 and 6 are designated by like numerals. In the embodiment shown in FIG. 6, the caller identity is passed on to the network step S1. At step S2 the caller information is used to access the home PLMN 18. The home PLMN 18 accesses the proxy, which may be a proxy server 24 at the home PLMN to obtain the information regarding the preferred and alternative payment providers by utilizing the caller identity to access the alternate payment information for that caller. The caller's identity may also be manually keyed into the mobile unit by the keypad and then used by the system to access the database remote from the caller's mobile unit to obtain the identity of the payment providers for that user.

If the authorization is not accepted, the calling party is requested to authorize the credit as per steps S3 and S4. Upon receipt of authorization, step S5, request for authorization is made to service provider 20, at step S6. Upon receipt of authorization, at step S7, the link is provided at step S8. Upon completion of the call, the debit bill is rendered at step S9 and reconciliation occurs at step(s) S10.

The device seeking a communications link and establishing the payment provider may communicate with the device by way of a personal network such as Bluetooth or IEEE 802.11 (more information needed).

As another alternative, the data relating to the calling party may be stored in a server attached to or otherwise associated with the internet whereupon the home PLMN may access the server in the internet to retrieve the alternate payment information.

What is claimed is:

1. In a communication system providing a communications link between electronic devices via at least one network, a method for selecting a payment provider to pay for communication services, the method comprising:
   (a) providing, in a calling electronic device, data identifying a plurality of alternative payment providers;
   (b) said calling electronic device initiating a request for a communications link with a called electronic device;
   (c) said calling electronic device communicating the data identifying the alternative payment providers to said network via said communications link;
   (d) said network contacting a first one of the alternative payment providers requesting acceptance of a payment request associated with the communications link; and
   (e) said network contacting a second one of said alternative payment providers upon refusal of the first alternative payment provider to accept responsibility for said payment request, without need for further interfacing with a user of the calling electronic device.

2. The method of claim 1 further comprising providing the calling electronic device with a subscribing identity module (SIM) card and inserting the data provided in step (a) into said SIM card.

3. The method of claim 2 wherein said SIM card is removably inserted into the calling electronic device.

4. The method of claim 2 wherein the data of step (a) entered into the SIM card is transferred to another storage device in the calling electronic device.

5. The method of claim 1 wherein said calling electronic device is one of a group of devices including a wireless cell phone, personal digital assistant (PDA), personal computer (PC), facsimile apparatus and self propelled vehicle.

6. The method of claim 1 wherein said network includes a first public land mobile network (PLMN) which is the home network for the calling electronic device and a second PLMN visited by said calling electronic device during a roaming mode, wherein step (c) further includes said second PLIVIN receiving said data identifying said alternative payment providers from said calling electronic device and forwarding said data to said first PLMN for subsequent transfer to a selected one of said alternative payment providers.

7. The method of claim 1 wherein said network comprises a home public land mobile network (PLMN) servicing said calling electronic devices whereby said data identifying said alternative payment providers is stored in a storage device in said calling electronic device.

8. The method of claim 7 wherein said calling electronic device is a wireless mobile cell phone, and said storage device is a subscriber identity module (SIM) card, whereby said data identifying said alternative payment providers is stored in said SIM card, and said SIM card is removably inserted into said mobile cell phone.

9. The method of claim 1 wherein one of said alternative payment providers provides credit card services for the calling electronic device and, upon acceptance of said payment request, provides authorization to said network; and wherein said network, upon receipt of said authorization, provides the communications link requested by the calling electronic device.

10. The method of claim 1 wherein one of said alternative payment providers provides debit card services for the calling electronic device and, upon acceptance of said payment request, provides authorization to said network; and wherein said network, upon receipt of said authorization, provides the communications link requested by the calling electronic device.

11. The method of claim 1 wherein a preferred one of said alternative payment providers provides calling card services for the calling electronic device and, upon acceptance of said payment request, provides authorization to said network; and wherein said network, upon receipt of said authorization, provides the communications link requested by the calling electronic device.

12. The method of claim 1 wherein one of said alternative payment providers provides pre-paid calling card services for the user of the calling electronic device and, upon acceptance of said payment request, provides authorization to said network; and wherein said network, upon receipt of said authorization, provides the communications link requested by the calling electronic device.

13. The method of claim 1 further comprising storing subscriber authorization data in the calling electronic device requiring that the network requests the user of the calling electronic device to authorize the communications link in addition to one of the alternative payment providers accepting responsibility for said payment request, and further including said network requesting said user to provide authorization responsive to receipt of the subscriber authorization data; and said user transmitting a signal via the calling electronic device to the network responsive to the request for authorization.

14. The method of claim 13 wherein the network, upon receipt of the a signal transmitted by the user indicating a refusal to authorize payment, terminates the communications link.

15. The method of claim 13 wherein the network, upon receipt of a signal transmitted by the user indicating authorization of payment, completes the communications link.

16. The method of claim 1 wherein said network, responsive to receipt of a request from said user, calculates a cost of establishing a communications link and conveys the calculated cost to the first alternative payment provider.

17. The method of claim 16 wherein the calculation takes into account factors affecting a cost of the communications link.

18. The method of claim 17 wherein the calculation determines the time of day, day of week, nature of the information to be transmitted, and distance between calling and called electronic devices.

19. The method of claim 1 further comprising:

said network examining costs charged by the alternative payment providers designated by the user and determining the most cost-efficient payment provider.

20. The method of claim 19 further comprising:

said network contacting the most cost-efficient payment provider requesting authorization.

21. A communication system for selecting a payment provider to pay for communication services, the system comprising:

at least one network; and a calling electronic device having data provided therein that identifies a plurality of alternative payment providers, wherein:

said calling electronic device initiates a request for a communications link with a called electronic device and communicates the data identifying the alternative payment providers to said network via said communications link;

said network contacts a first one of said alternative payment providers requesting acceptance of a payment request associated with the communications link; and said network contacting a second one of said alternative payment providers upon refusal of the first alternative payment provider to accept responsibility for said payment request, without need for further interfacing with a user of the calling electronic device.

22. The system of claim 21 wherein said provided data is stored in a subscriber identity module (SIM) card which is removably inserted into the calling electronic device.

23. The system of claim 21 wherein said calling electronic device is one of a group of devices including a wireless cell phone, personal digital assistant (PDA), personal computer (PC), facsimile apparatus, and self propelled vehicle.

24. The system of claim 21 wherein said network includes a first public land mobile network (PLMN) which is the home network for the calling electronic device and a second PLMN visited by said calling electronic device during a roaming mode, wherein said second PLMN receives said data identifying said alternative payment providers from said calling electronic device and forwards said data to said first PLMN for subsequent transfer to a selected one of said alternative payment providers.

25. The system of claim 21 wherein said network comprises a home public land mobile network (PLMN) servicing said calling electronic device, whereby said data identifying said alternative payment providers is stored in a storage device in said calling electronic device.

26. The system of claim 25 wherein said calling electronic device is a wireless mobile cell phone, and said storage device is a subscriber identity module (SIM) card, whereby said data identifying said alternative payment providers is stored in said SIM card, and said SIM card is removably inserted into said mobile cell phone.

27. The system of claim 21 wherein one of said alternative payment providers provides credit card services for the calling electronic device and upon acceptance of a request for payment from said network, provides authorization to said network; and wherein said network, upon receipt of said authorization, provides the communications link requested by the calling electronic device.

28. The system of claim 21 wherein one of said alternative payment providers provides debit card services for the calling electronic device and upon acceptance of a request for payment from said network, provides authorization to said network; and wherein said network upon receipt of said authorization, provides the communications link requested by the calling electronic device.

29. The system of claim 21 wherein a preferred one of said alternative payment providers provides calling card services for the calling electronic device and upon acceptance of a request for payment from said network provides authorization to said network; and wherein said network, upon receipt of said authorization, provides the communications link requested by the calling electronic device.

30. The system of claim 21 wherein one of said alternative payment providers provides pre-paid calling card services for the calling electronic device and, upon acceptance of a request for payment from said network, provides authorization to said network; and wherein said network, upon receipt of said authorization, provides the communications link requested by the calling electronic device.

31. The system of claim 21 wherein the data identifying said alternative service providers further includes subscriber authorization data requiring that the network requests the user of the calling electronic device to authorize the communications link in addition to one of the alternative payment providers accepting responsibility for said payment request, wherein said user transmits a signal via the calling electronic device to the network responsive to the request for authorization.

32. The system of claim 31 wherein said network, upon receipt of a signal transmitted by the user indicating a refusal to authorize payment, terminates the communications link.

33. The system of claim 31 wherein said network, upon receipt of a signal transmitted by the user indicating the user's authorization of a payment, completes the communications link.

34. The system of claim 31 wherein said network, responsive to receipt of a request from said user, calculates a cost of establishing a communications link and conveys the calculated cost to the first alternative payment provider.

35. The system of claim 34 wherein the calculated cost takes into account factors affecting a cost of the communications link.

36. The system of claim 34 wherein the calculated cost is determined based on the time of day, day of week, nature of the information to be transmitted and distance between calling and call parties.

37. The system of claim 21 wherein the network examines costs charged by the alternative payment providers identified in the calling electronic device and requests the most cost efficient one of the alternative payment providers to accept responsibility for said payment request.

38. In a communication system providing a communications link between electronic devices via at least one network, a method for selecting a payment provider to pay for communication services, the method comprising:

(a) providing, in a calling electronic device, data identifying a plurality of alternative payment providers;

(b) said calling electronic device initiating a request for a communications link with a called electronic device;

(c) said calling electronic device communicating the data identifying the alternative payment providers to said network via said communications link;

(d) said network determining which one of the alternative payment providers is most cost-efficient; and (e) said network contacting the one most cost-efficient alternative payment provider to request authorization for payment.

39. The method of claim 38 wherein step (d) further includes determining cost efficiency based on rewards programs.

40. The method of claim 38 wherein step (d) further includes determining cost efficiency based on a rewards programs in combination with evaluating costs of the alternative payment providers.

41. A communication system for selecting a payment provider to pay for communication services, the system comprising:

at least one network; and a calling electronic device having data provided therein that identifies a plurality of alternative payment providers, wherein:

said calling electronic device initiates a request for a communications link with a called electronic device and communicates the data identifying the alternative payment providers to said network via said communications link; and said network examining costs charged by the alternative payment providers requesting the most cost efficient payment provider to accent responsibility for a payment request associated with the communications link.

42. The system of claim 41 wherein the network evaluates rewards programs offered by the alternative payment providers in combination with the costs charged by the alternative payment providers.

* * * * *

UNITED STATES PATENT AND TRADEMARK OFFICE
CERTIFICATE OF CORRECTION

PATENT NO. : 6,726,092 B2 Page 1 of 1
APPLICATION NO. : 10/040999
DATED : April 27, 2004
INVENTOR(S) : Goldberg et al.

It is certified that error appears in the above-identified patent and that said Letters Patent is hereby corrected as shown below:

IN THE CLAIMS

In claim 6, column 9, line 17, delete "PLIVIN" and insert therefor --PLMN--,
In claim 7, column 9, line 24, after the word "electronic", delete "devices" and insert therefor --device--.
In claim 14, column 10, line 9, after the word "of", delete "the".
In claim 28, column 11, line 28, after the first instance of the word "said", delete "network" and insert therefor --network,--
In claim 29, column 11, line 33, after the word "device", delete "and" and insert therefor --and, --.
In claim 29, column 11, line 34, after the word "said", delete "network" and insert therefor --network, --.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,726,092 B2 | Page 1 of 1 |
| APPLICATION NO. | : 10/040999 | |
| DATED | : April 27, 2004 | |
| INVENTOR(S) | : Goldberg et al. | |

It is certified that error appears in the above-identified patent and that said Letters Patent is hereby corrected as shown below:

Title Page;

IN THE DRAWINGS

In Figure 1, add the legend --PRIOR ART--.

IN THE SPECIFICATION

At column 4, line 16, after FIG 2 delete the word "shown" and insert therefor --shows--.

At column 7, line 62, after "arrangement" delete "(more information needed here)."

At column 8, line 39, after "8021.11" delete "(more information needed here)."

Signed and Sealed this

Thirtieth Day of October, 2007

JON W. DUDAS
*Director of the United States Patent and Trademark Office*